INVENTORS
T. O. WARD and STANLEY EATON
By William C. Linton
ATTORNEY

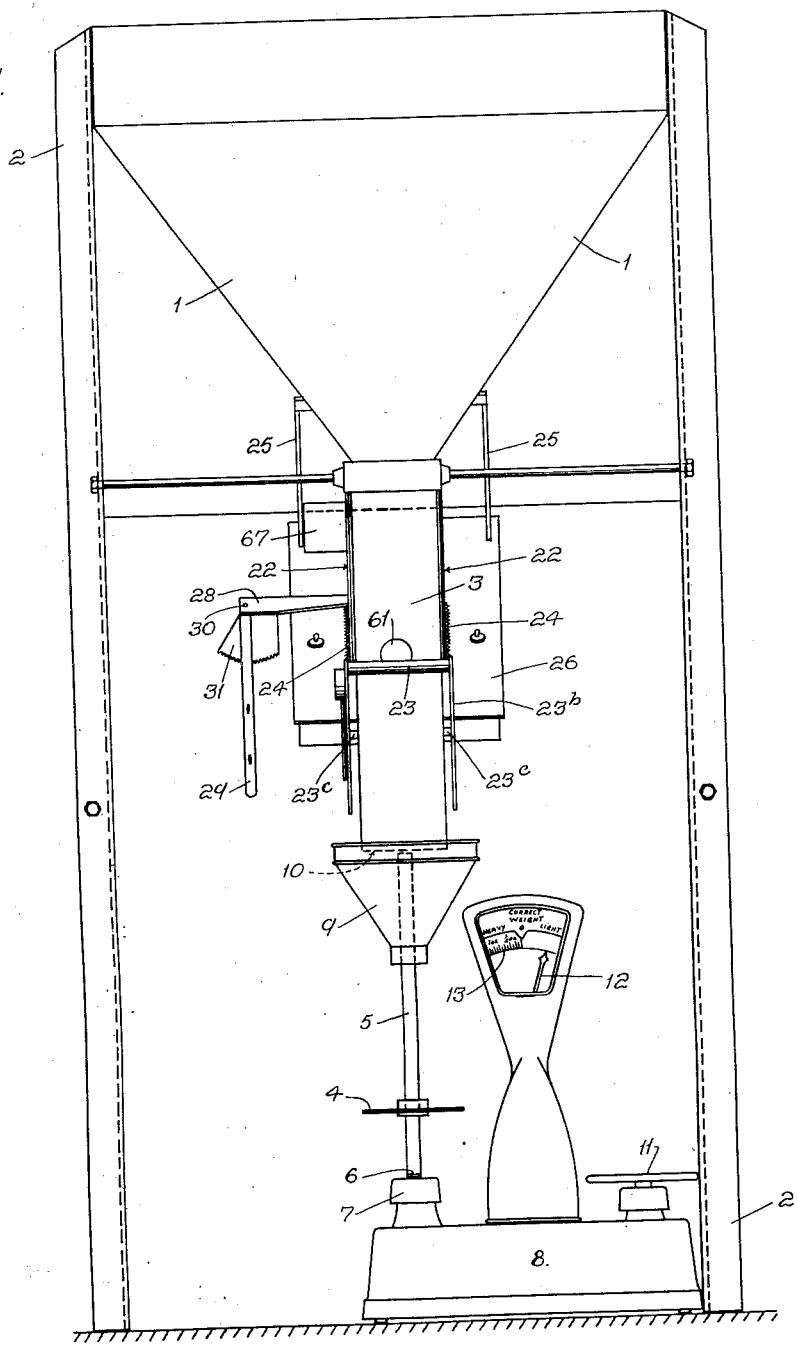

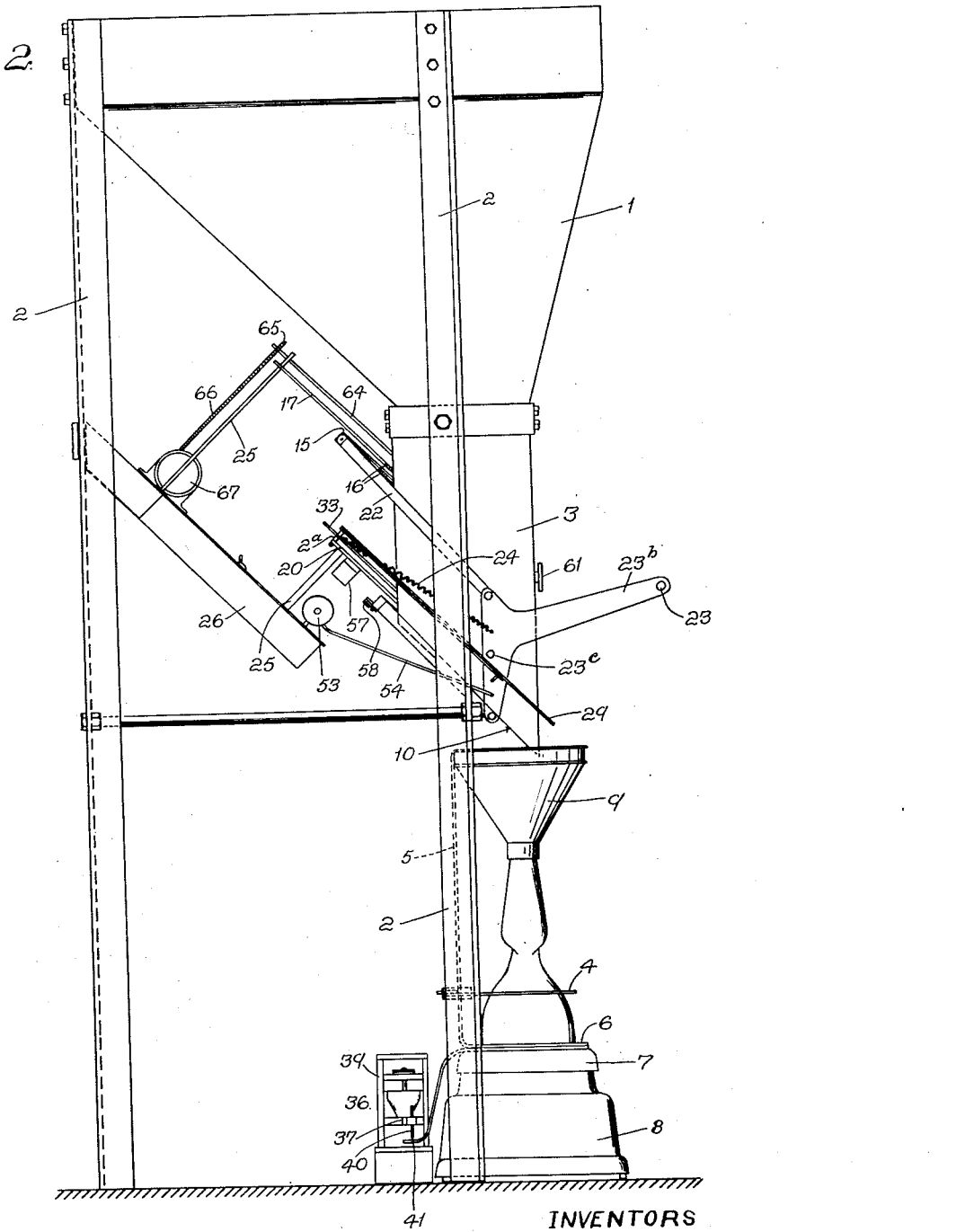

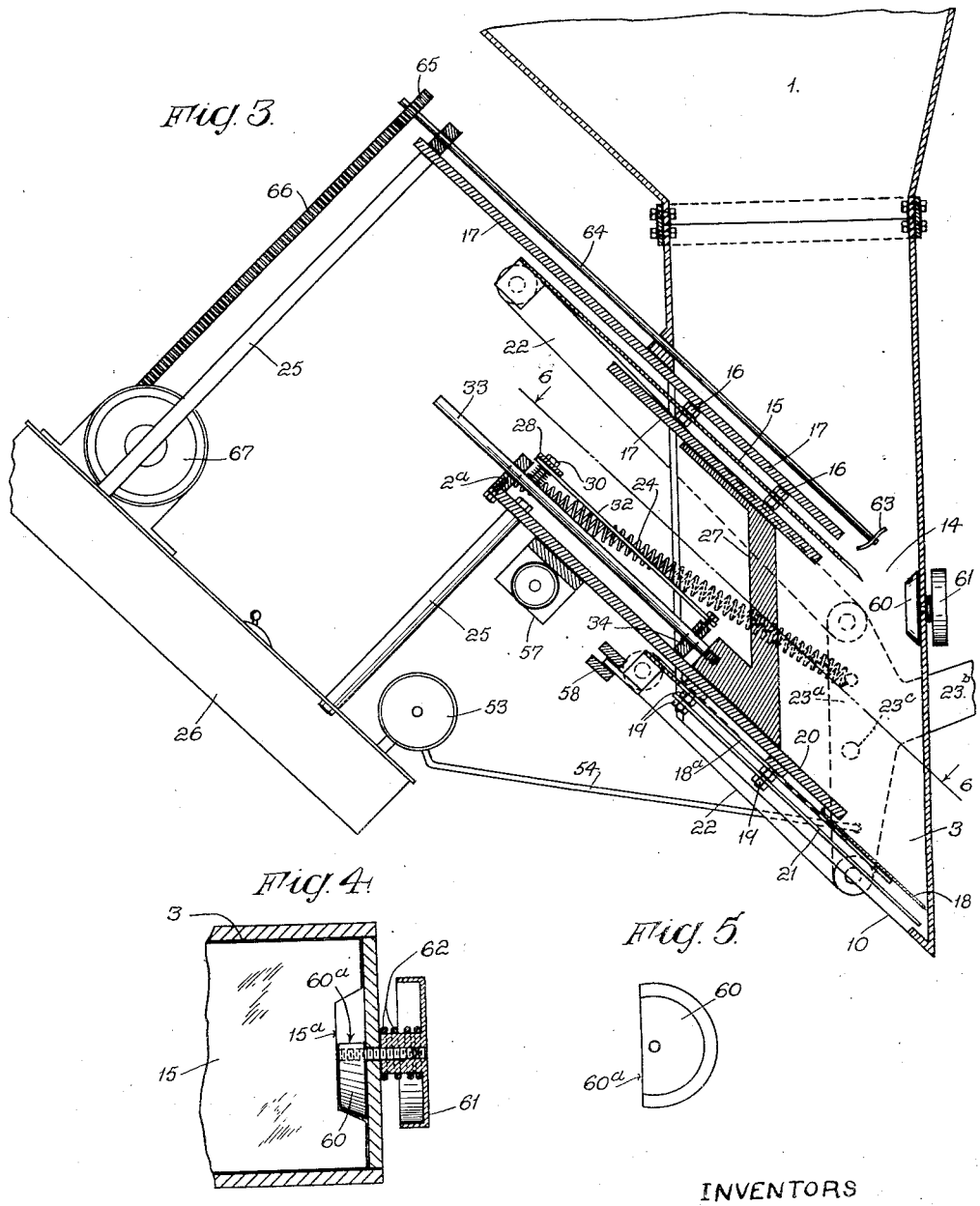

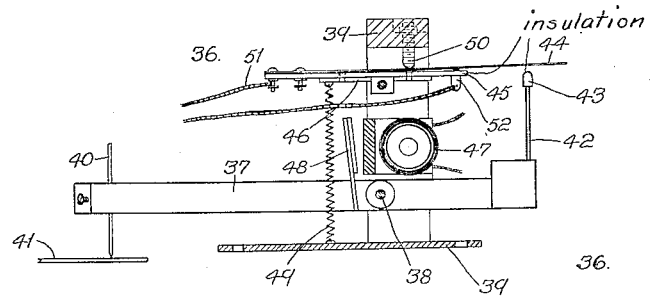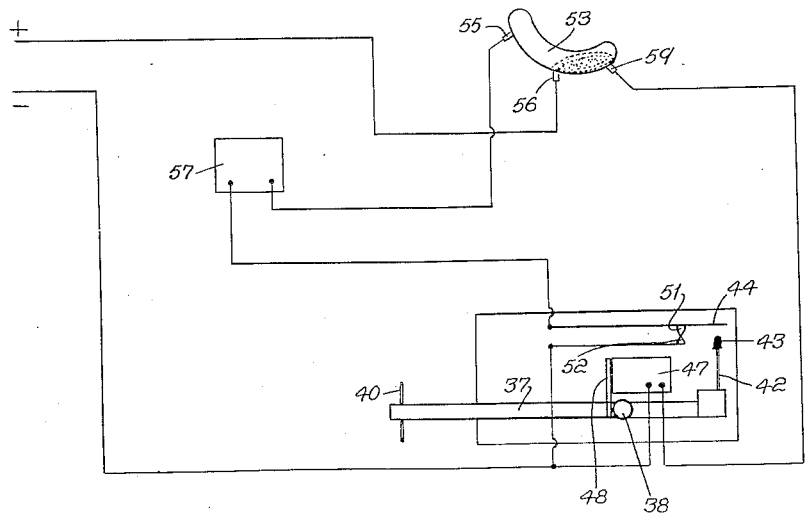

Patented Nov. 9, 1937

2,098,324

UNITED STATES PATENT OFFICE 2,098,324

APPARATUS FOR DELIVERING AND WEIGHING PREDETERMINED QUANTITIES OF MATERIAL

Thomas Ottiwell Ward, Roby, and Stanley Eaton, Mossley Hill, Liverpool, England

Application June 10, 1936, Serial No. 84,538
In Great Britain June 15, 1935

2 Claims. (Cl. 249—15)

This invention relates to apparatus for delivering and weighing predetermined quantities of granular or like material, of the type as shown in U. S. Patent No. 1,986,268 in which a supply hopper is adapted to intermittently communicate with a measuring chamber from which the material is discharged onto the goods pan or weighing device, the weight being subsequently made up by a dribble feed.

The aim of the present invention is to improve upon such apparatus by simplifying the construction and expediting operation, while ensuring, as far as practical, accurate weighing of the material in uniform and equal quantities. Our invention is characterized in that the apparatus includes a slidably disposed and preferably inclinedly arranged plate or shutter valve for controlling the supply of material from the hopper to the measuring chamber and a similar valve for controlling the supply of material from said measuring chamber to the weighing device, said valves being adapted to be so operated or reciprocated in unison with each other within respective guides that when the discharge orifice of the hopper is open the discharge orifice of the measuring chamber is closed, and vice versa; and a relatively small opening or aperture formed in the hopper plate or shutter valve for permitting—after said hopper valve has been closed—a continuous dribble or trickle of the material from the hopper through the measuring chamber direct to the scale pan, such dribble opening or aperture being adapted to be controlled or regulated by means of a closure member disposed within said opening and operated by an external handle; and means adapted to compensate for the material in flight between the hopper and the weighing device after cut-off of the supply.

Preferably, the capacity of the measuring chamber may be varied or adjusted to suit different requirements or materials, and this adjustment may be effected by providing the rear side of the chamber with a movable and adjustable partition or piston operable in any appropriate manner from the exterior of the apparatus as by means of a lever motion which may be arranged to register with any one of a series of markings provided on a scale or indicator, so that the capacity of the measuring chamber for different adjustments is readily ascertainable.

In order to ensure and so maintain a constant feed of the material from the hopper into the measuring chamber, a rotary agitating device may be disposed within the apparatus adjacent to the discharge orifice of the hopper, being positioned above said dribble opening.

We will further describe our invention with the aid of the accompanying sheets of explanatory drawings which illustrate, by way of example only, one mode of carrying the invention into effect.

In said drawings:—

Figs. 1 and 2 are front and side elevations, respectively, of an apparatus constructed in accordance with our invention.

Fig. 3 is an enlarged side-sectional elevation of operating parts of the apparatus.

Fig. 4 is a fragmentary plan view, mainly in section, of the dribble arrangement associated with the discharge shutter of the hopper, so that when the latter is closed a controlled and relatively small quantity of the material is permitted to pass through the measuring chamber to the scale pan for the purpose of contributing to an accurate weighing of the material, and Fig. 5 is a front elevation illustrating the configuration of the closure device operable within the dribble opening.

Figure 6:
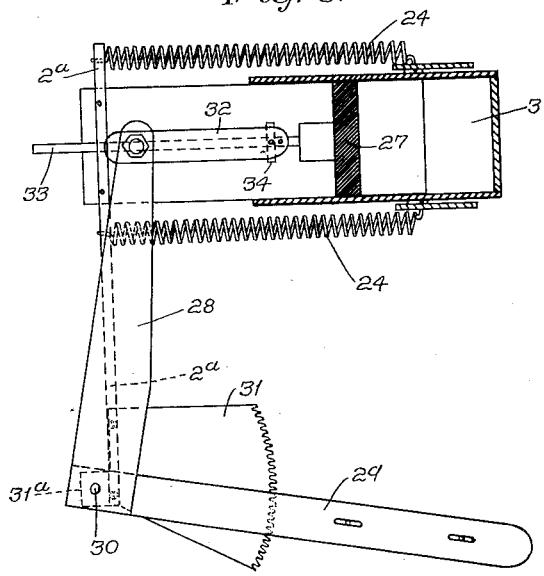
Figure 7:
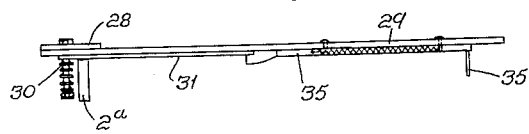
Figure 8:
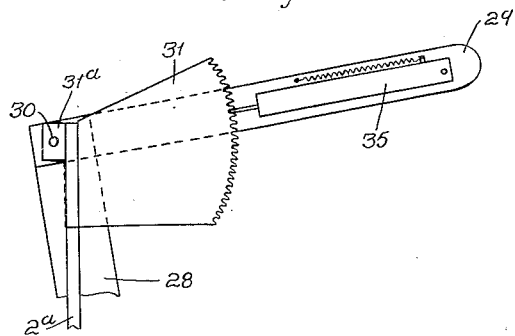

Fig. 6 is a plan view, in part section, taken as on line 6—6 Fig. 3 and viewed in the direction of the arrows, illustrating in detail the piston or plunger with operating means for same, whereby the capacity of the measuring chamber may be altered or varied to suit different material or requirements; whilst Figs. 7 and 8 are side elevation and inverted plan view, respectively, showing the operating lever and toothed quadrant arrangement disconnected from the piston or plunger of Fig. 6.

Fig. 9 is a side elevation, partly in section, of the compensating arrangement or electrical mechanism associated with the scale pan as shown in Fig. 2, detached.

Fig. 10 is a wiring diagram of the electrical circuit of the apparatus.

In the several views like characters of reference denote like or equivalent parts wherever they occur.

Referring to the drawings, 1 designates a supply hopper adapted to contain in bulk material, such as tea, sugar, or the like granular substance to be weighed and delivered into small or predetermined quantities of equal and accurate weight and which hopper is supported by a suitable rectangular frame structure 2.

Said hopper 1 is adapted to intermittently communicate with a measuring chamber 3 from which the material is discharged into a bag, or the like, placed upon a goods pan or platform 4 adjustably carried by an upright arm 5 of a bracket 5, 6 affixed to the movable base member 7 of a weighing scale 8 which may be of any suitable known construction: the upper end of arm 5 carries a funnel 9 which is disposed below the discharge orifice 10 of measuring chamber 3. The form of weighing device illustrated is a customary balance scale including goods and weight pans 4 and 11, respectively, and a pointer 12 moving over a chart 13 having a central zero position, so that when the exact balance is obtained said pointer 12 coincides with zero position on the chart 13, whilst if the material supplied to the goods platform 4 is too heavy or too light, such a state is indicated by the pointer 12 resting to left or right of said zero position, as the case may be.

The discharge orifice 14 of hopper 1 is provided with a valve or closure device consisting of a slidably disposed and inclinedly arranged—preferably at an angle of about 45°—plate or shutter 15 having studs or runners 16 fitted on both sides in order to reduce friction when said shutter valve 15 is operating within suitably spaced parallel guides 17 provided in the upper end of the measuring chamber 3, whilst the discharge orifice 10 of said measuring chamber is also provided with an inclined closure plate or shutter 18 parallel with hopper shutter 15 and carried by spaced parallel guides 18ª which constitute rear extensions of shutter 18 and operate within guide studs or bearings 19 carried by a stationary guide plate 20 disposed at the lower end of measuring chamber 3. Said studs 19 also carry a baffle strip 21 adapted to steady the flow of material passing through discharge opening 10.

The leading edges of hopper shutter 15 and measuring chamber shutter 18 are preferably chamfered or provided with knife edges so as to facilitate the passage of said shutters through the material, and said shutters or valves 15 and 18, 18ª are adapted to be so operated or reciprocated in unison with each other within their respective guides that when the discharge orifice 14 of hopper 1 is opened the discharge orifice 10 of the measuring chamber 3 is closed and vice versa, and in the arrangement shown to effect this end, said closure valves or shutters are interconnected or coupled together through the aid of links 22 externally arranged at opposite sides of chamber 3, each link being pivotally connected to an upper end of a respective shutter and also similarly connected at its opposite end to one end of an arm 23ª of an operating handle 23 having its side arms 23ᵇ fulcrumed at 23ᶜ to opposite sides of measuring chamber 3.

Normally, the discharge orifice 10 of the measuring chamber 3 is maintained closed and the discharge orifice 14 of the hopper 1 open—as shown in Figs. 2 and 3—by means of coiled extension springs 24 having opposite ends thereof anchored between a stationary bracket 2ª of the apparatus and said arms 23ª of operating handle 23; the arrangement being such that the shutters or valves 15 and 18, 18ª are simultaneously moved or reciprocated within their respective guides to reverse positions against the resistance of said springs 24 by downward movement of operating handle 23.

Distance or tie-rods 25 secured to guide plates 17, 20 support a switch-box 26 which may contain a step-down transformer and rectifier.

The capacity of the measuring chamber 3 may be varied or adjusted to suit different requirements or materials, and, as illustrated in the drawings, this may be conveniently accomplished by providing the rear side of said chamber with a slidable and adjustable partition or piston 27 operable from the exterior of the apparatus by means of a rectangular hand lever 28, 29 fulcrumed at 30 to an extension 31ª of a toothed quadrant 31 secured to stationary bracket 2ª of the apparatus. Arm 28 of lever 28, 29 is attached to piston 27 by means of a link 32 pivotally connected with arm 28 and piston 27, whilst the latter is also fitted with a guide rod 33 which passes through bracket 2ª, said rod 33 being secured to link 32 by means of a collar 34. Said lever 28, 29 is maintained in any position of adjustment by means of a spring-return trigger action 35 engaging with said toothed quadrant 31. A scale or indicator may be associated with the lever 28, 29 so that the capacity of the measuring chamber for different adjustments may be readily ascertainable.

In order to compensate for the quantity of material in flight between the discharge orifice 10 of the measuring chamber 3 and the goods platform 4 of the scale 8, a compensating mechanism generally designated 36 is provided, and is shown positioned in Fig. 2 and detached in Fig. 9. Said mechanism 36 includes an arm or lever 37 fulcrumed at 38 to a supporting frame or base 39, and is provided at one end with an adjustably disposed needle or rod 40 adapted to normally and lightly rest upon the face of a co-operating bracket 41 moving with the base 7 of goods pan 4 of weighing scale 8. The opposite end of lever 37 rigidly carries a vertical rod 42 at the upper end of which is fitted an abutment or knob 43 of insulating material adapted to move into and out of engagement with a spring contact metal strip 44 secured at one end upon an insulator bar 45; said contact strip and bar 45 are carried by a pivotal carrier 46 which constitutes a make-and-break device.

The lever 37 is so mounted upon its fulcrum 38 that, when free to do so, the end bearing the needle 40 will just follow the movement of the bracket 41 with the scale pan 4, but will not exert any appreciable pressure thereon. An electro-magnet 47 is mounted for co-operating with an arm or keeper 48 extending upwardly from lever 37 so that when energized said magnet 47 will move said lever about its fulcrum 38 and raise the needle 40 off said scale bracket 41.

The pivotal contact carrier 46 of the make-and-break device has a spring 49 at one end so that its opposite end is forced into abutment with an adjustable stop or screw 50 also carried on the supporting frame 39; the arrangement being such that said pivotal carrier 46 may be adjusted by means of the screw 50 so as to permit alteration of the point at which the insulated abutment 43 of the vertical rod 42 will engage with the spring metal contact strip 44 and break the electrical connection 51 associated therewith and the contact 52 of the electrical circuit—see Fig. 10—due to downward movement of the end of lever 37 by reason of its needle 40 following the bracket 41 of scale pan 4.

The operating electrical circuit is controlled by means of a mercury switch 53 oscillatory on a bracket of the apparatus and which switch is attached by way of a connecting link 54 with the movements of the valve-actuating hand lever 23, downward movement of which latter initially opens the discharge orifice 10 of the measuring chamber 3 simultaneously with the closing of the hopper orifice 14 by the action of the respective closure plates or shutters 15 and 18, 18a working in unison. In this movement said mercury switch 53 bridges the contacts 55, 56 of a circuit—as shown in diagram in Fig. 10—designed to energize an electro-magnet 57 situated to co-operate with a member 58 disposed at the external end of plate or shutter 18 of the measuring chamber 3 in order to maintain the discharge orifice of same open. Simultaneous with this movement, mercury switch 53 opens the contacts 56, 59 so as to de-energize electromagnet 47 before described to allow the free end of said pivotal arm or lever 37 to follow through a regulatable distance the downward movement of the goods pan 4 on material being supplied thereto.

Such a state exists until insulated knob 43 at the other end of lever 37 engages spring contact arm 44 to open the contacts 51, 52 and break the circuit through shutter magnet 57, so that said plate or shutter 18 of the measuring chamber 3 is permitted to return to its closed position—and hopper shutter 15 to open position—through the action of the springs 24 as before described. Such movement of the valves again operates mercury switch 53 to bridge contacts 56, 59 and energize magnet 47 which lifts the lever 37—by co-operation with arm 48 thereof—off the scale pan bracket 41 so freeing the latter to enable the weight to be checked preparatory to the next filling operation in which the initial movement is effected by means of the hand lever 23 as hereinbefore described.

For the purpose of contributing to an accurate weighing of the material, the bottom of the closure plate or shutter 15 of hopper 1 is provided with a relatively small opening 15a—as shown in detail in Fig. 4—the arrangement being such that after said shutter plate 15 has been closed said opening 15a permits a continuous dribble or trickle of the material from the hopper 1 through measuring chamber 3 direct to scale pan 4. For controlling or regulating the quantity of such dribble opening 15a a closure member 60 is movably disposed therein and is provided with a cam or eccentric face 60a: said closure is operated by an external handle 61 rotatably mounted in the front of the measuring chamber 3 and securely held in any position of adjustment by means of a compression spring 62. With such a closure arrangement, the dribble opening 15a is automatically cleared of any material that may lodge therein at each closing operation of shutter 15 by reason of the entry of closure 60 into such opening.

Alternatively, said plate opening 15a may be otherwise located and associated with an adjustable slide or other suitable flow control device.

In order to ensure and so maintain a constant feed of the material from the hopper 1 into the measuring chamber 3 a rotary agitating device 63 is disposed within the apparatus adjacent to the discharge orifice 14 of hopper 1 and situated above the dribble opening 15a. Said agitator is fixed to a shaft 64 which extends through bearings provided in a side of hopper 1 and bracket 17, and to this end of shaft 64 there is secured a sprocket wheel 65 adapted to be driven—as and when desired—by means of a chain connection 66 with a small electric motor 67 mounted in any convenient manner by means of a bracket fixed to box 26 of the apparatus: alternatively, said agitating device may be operated when required by hand through the medium of a small crank handle affixed to the external end of the spindle 64 in lieu of said sprocket wheel 65.

What we claim as our invention and desire to secure by Letters Patent is:—

1. Apparatus for automatically delivering and weighing predetermined quantities of granular and like material, of the type referred to, comprising a slidably disposed plate shutter valve for controlling the supply of material from the hopper to the measuring chamber of said apparatus and a similar valve for controlling the supply of material from said measuring chamber to the weighing device, said valves being adapted to be so reciprocated in unison with each other that when the discharge orifice of the hopper is open the discharge orifice of the measuring chamber is closed and vice versa, said hopper plate shutter valve having a relatively small aperture formed therein for permitting after said hopper valve has been closed a continuous dribble of the material from the hopper through the measuring chamber direct to the scale pan, a closure member disposed within said dribble aperture for controlling the area of said dribble aperture, an external handle connected to and operating said closure member, and means to compensate for the material in flight between the hopper and the weighing device after cut-off of the supply.

2. In apparatus for automatically delivering and weighing granular and like material as claimed in the preceding claim 1, a mercury switch operably connected to the valve-operating member, electrical mechanism controlled by said mercury switch for compensating for the material in flight between the measuring chamber and the weighing device after cut-off of the supply to the latter, said mechanism including a lever which is so pivotally mounted as to bear lightly upon and so follow the movement of the weighing device due to the weight of material supplied thereto, electrical means associated with said valves and actuated by said lever after it has followed the movement of the weighing device through a certain distance for cutting off the supply of material and electrical means, brought into operation when the supply of material is cut off, for lifting the end of the lever bearing on the weighing device clear therefrom for the purpose of enabling the weight of material supplied to the device to be checked.

THOMAS OTTIWELL WARD.
STANLEY EATON.